United States Patent [19]

Uozumi et al.

[11] 4,407,904
[45] Oct. 4, 1983

[54] FUEL CELL

[75] Inventors: Norihira Uozumi, Hitachi; Takeo Yamagata, Takahagi; Saburo Yasukawa, Hitachi; Yasuyuki Tsutsumi, Hitachi; Seiichiro Ono, Hitachi, all of Japan

[73] Assignees: Hitachi, Ltd.; Hitachi Chemical Company, Ltd., both of Tokyo, Japan

[21] Appl. No.: 349,813

[22] Filed: Feb. 18, 1982

[30] Foreign Application Priority Data

Feb. 20, 1981 [JP] Japan .................................. 56/24654

[51] Int. Cl.³ ........................ H01M 8/02; H01M 8/24
[52] U.S. Cl. ......................................... 429/26; 429/39
[58] Field of Search ............................. 429/38, 39, 26

[56] References Cited

U.S. PATENT DOCUMENTS

| 3,436,272 | 4/1969 | Gelting | 429/39 |
| 3,476,009 | 11/1969 | Gelting et al. | 429/29 |
| 3,573,102 | 3/1971 | Lane et al. | 429/39 |
| 3,573,104 | 3/1971 | Snyder et al. | 429/39 |
| 3,801,374 | 4/1971 | Dews et al. | 429/26 |
| 4,233,369 | 11/1980 | Breault et al. | 429/26 |

FOREIGN PATENT DOCUMENTS 2309991 12/1976 France .................................. 429/39

Primary Examiner—Donald L. Walton
Attorney, Agent, or Firm—Antonelli, Terry & Wands

[57] ABSTRACT

A fuel cell comprises unit cells stacked through separators therebetween; each unit cell comprising a fuel electrode plate, an oxidizing agent electrode plate and a matrix between electrode plate and the oxidizing agent plate, U-shaped gas flow passages for the fuel electrode and for the oxidizing agent electrode are provided in a counter-current relation to each other with gas inlets and gas outlets for the fuel electrode and the gas inlets and the gas outlets for the oxidizing agent electrodes being provided at the opposite sides of the fuel cell, respectively, and communicated respectively with manifolds at the same opposite sides of the fuel cell. The fuel cell is simple in structure, highly reliable in fabrication, operation and maintenance, and high in gas utilization efficiency.

8 Claims, 11 Drawing Figures

FUEL CELL

BACKGROUND OF THE INVENTION

The present invention relates to a fuel cell, and particularly to a fuel cell of manifold type.

A fuel cell is in such a structure as to supply and discharge fuel and an oxidizing agent, for example, air. According to an inside passage type, one type of the fuel cell, a common passage for supplying and discharging a gas is provided in an electrode, but such type has a complicated electrode structure, often making gas distribution to a gas reaction part uneven, and is substantially not applicable to a large fuel cell. Thus, a fuel cell of manifold type, in which gas supply and discharge are carried out through manifolds provided at four sides of a stacked fuel cell, has been recently used as a large fuel cell.

One example of the conventional fuel cell of manifold type will be outlined below, referring to drawings.

In FIG. 1 showing a schematic cutaway view of members constituting a fuel cell, FIG. 2 showing a schematic view of a stacked state of the members of FIG. 1, and FIG. 3 showing a partial cutaway plan view of a stacked fuel cell in a housing tank, a fuel electrode plate 1 and an air electrode plate 2 are comprised of graphite fibers, and are each provided with a large number of ribs on one side thereof, forming a gas passage 3. At the flat side opposite to the ribbed side is provided a catalyst layer 4 prepared, for example, by coating graphite powder containing diffused platinum powder thereon. The fuel electrode plate 1 and the air electrode plate 2 are stacked through a matrix 5 for retaining an electrolyte solution, for example, a phosphoric acid solution so that the flat sides can be tightly secured face-to-face, and the gas passages 3 provided on the electrode plates can be crossed on one electrode plate to another to form a unit cell. The thus arranged unit cells are stacked through separators 6 for fuel and air. A cooler 7 is also a ribbed plate provided with cooling tubes 8 between the ribs, and is provided for a predetermined number of the unit cells. Both end of each cooling tube 8 are connected to an inlet main pipe 11 and an outlet main pipe through an inlet branch pipe 9 and an outlet branch pipe 10.

Manifolds 13 are provided at four sides of the thus stacked assembly 14 to form spaces for supplying and discharging gases, and are also provided with gas supply pipes 15a and 15b and gas discharge pipes 16a and 16b through the housing tank 17 to permit gas supply and discharge from the outside of the housing tank 17. A cooling water supply pipe 18 and a cooling water discharge pipe 19 are connected to the inlet main pipe 11 and the outlet main pipe 12, respectively, in the manifold 13 through the housing tank 17 and the manifold 13.

A hydrogen gas as fuel is supplied to the fuel cell having the foregoing structure through the gas supply pipe 15a in the direction of full arrow line as in FIG. 3, and air through the gas supply pipe 15b in the direction of dotted arrow line to generate electric current by electrochemical reaction at the catalyst layers.

However, gas sealing of the fuel cell of such manifold type is effected only by tight sealing between the edge parts of the manifolds 13 and the edge parts at the four sides of the stacked assembly 14, and thus very high precision is required for dimensioning of the four sides. Furthermore, the cooling water pipings must be provided in the manifold, so that the structure of fuel cell is very complicated and its fabrication is not made easily. There is also a possibility of contact of the cooling water pipings with the vapor of phosphoric acid used as the electrolyte, with consequent restriction to the materials of construction of the cooling water piping. These are the disadvantages of the conventional fuel cell of manifold type.

SUMMARY OF THE INVENTION

An object of the present invention is to provide a fuel cell of manifold type with a simple structure and a high reliability in fabrication, structure and operation, free from the above-mentioned disadvantages.

The present invention provides a fuel cell comprising a plurality of unit cells each comprising a fuel electrode plate, an oxidizing agent electrode plate and a matrix, the fuel electrode plate and the oxidizing agent plate being disposed face-to-face through the matrix, the unit cells being stacked through separators between the unit cells, forming a stacked assembly, a gas flow passage for fuel electrode and oxidizing agent electrode being provided on one side each of the electrode plates or the separators, and manifolds for gas supply and discharge to the gas flow passages on the electrode plates or the separators being provided at sides of the stacked assembly, characterized by the gas flow passage having at least one gas inlet and at least one gas outlet at one edge of the electrode plate or separator, the gas inlet and the gas outlet being isolated by at least one partition wall extended along a gas flow direction and open at a position remotest from the gas inlet and gas outlet, thereby forming a U-type passage having at least one gas inflow path and at least one gas outflow path communicating to each other at the remotest position, the gas flow passage for the fuel electrode and the gas flow passage for the oxidizing agent electrode being arranged in a counter-current relation to each other, the gas inlets and the gas outlets for the fuel electrode and the gas inlets and the gas outlets for the oxidizing agent electrodes being provided at the opposite sides of the stacked assembly, respectively, and communicated respectively with the manifolds provided at the same opposite sides of the stacked assembly.

In contrast to the very complicated structure of the conventional fuel cell of manifold type due to the manifolds provided at the four sides of the stacked assembly, the present fuel cell has U-type gas flow of U-turn function on the fuel electrodes and the oxidizing agent electrodes or the separators, where a gas inlet and a gas outlet are provided only as openings on one side of the fuel electrode and the oxidizing agent electrode or the separator while other three sides are closed; the opening part of one electrode plate or one separator and that of another are so arranged as to permit the gas to take a counter-current flow one another in the respective gas flow passages, when stacked; and a fuel manifold and an oxidizing agent manifold, each having a gas inlet and a gas outlet for the fuel electrode and the oxidizing agent are arranged to correspond to the gas inlet and the gas outlet at the opening side of the stacked assembly.

That is, the present invention is characterized by a U-type gas flow passage for U-turning of gas flow provided on a fuel electrode and an oxidizing agent electrode or separator. The effect of U-turning a gas flow is to reuse an unutilized gas, thereby increasing a gas utilization efficiency. That is, the present inventors have found that a gas utilization efficiency can be increased by reusing a gas unutilized in a straight gas flow passage by U-turning the gas. For example, in the case of a fuel cell of straight gas flow passage generating a stable electric current with a gas utilization efficiency of 70%, that is, in a fuel cell of taking 100 parts by volume per hour of a gas at the gas inlet and discharging 30 parts by volume per hour of unutilized gas at the gas outlet, it has been found that a gas utilization efficiency can be increased to 82.4% by providing a partition wall along the gas flow at a half of the total width of the gas flow passage, so that the width of gas inlet can be equal to that of gas outlet, making the partition wall open at the remotest position from the gas inlet and the gas outlet, thereby effecting communication therebetween and forming a gas inflow path and a gas outflow path to U-turn the gas. Furthermore, it has been found that a gas utilization efficiency can be increased by providing the partition wall at a position in a ratio of the full width of the gas inflow path to the full width of the gas outflow path of 1–3:1, preferably about 3:1 along the gas flow in the case of a gas utilization efficiency of 60–70% in the straight gas flow passage, a U-turn the gas flow.

Furthermore, a fuel gas is gradually consumed along the gas flow, and it has been found that by making the full width of the gas inflow path larger than the full width of the gas outflow path, fuel gas molecule density can be made uniform over the catalyst, thereby uniformly generating electric current over the entire surfaces of the electrode plates.

Embodiments of the present invention will be described in detail below, referring to the drawings.

PREFERRED EMBODIMENTS OF THE INVENTION

Figure 1:
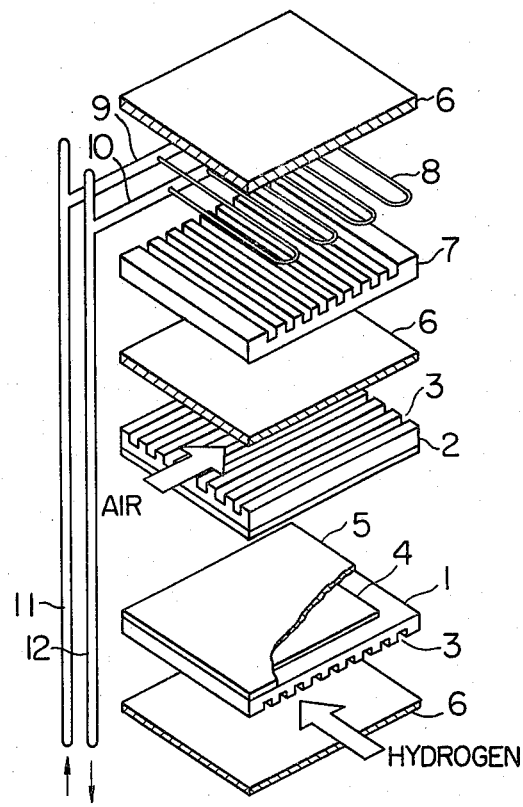
FIG. 1 is a schematic partial cutaway view of members constituting the conventional fuel cell of manifold type.
Figure 2:
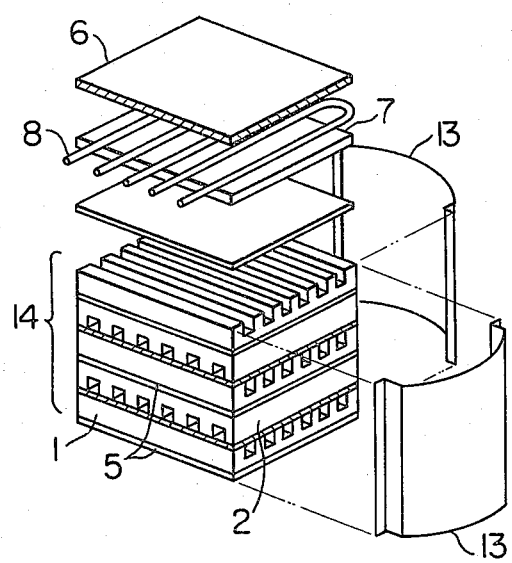
FIG. 2 is a schematic view of a stacked state of the members of FIG. 1.
Figure 3:
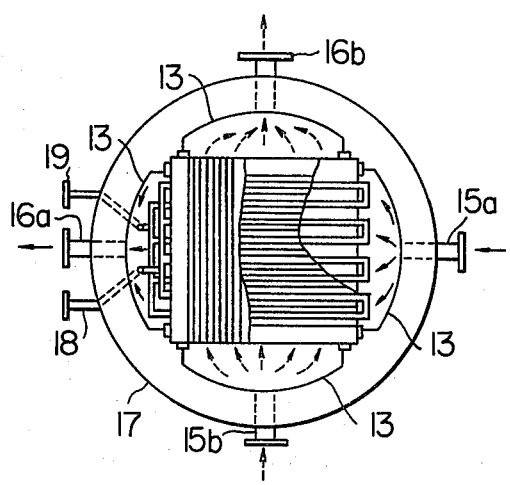
FIG. 3 is a partial cutaway plan view of a stacked fuel cell of FIG. 1 in a housing tank.
Figure 4:
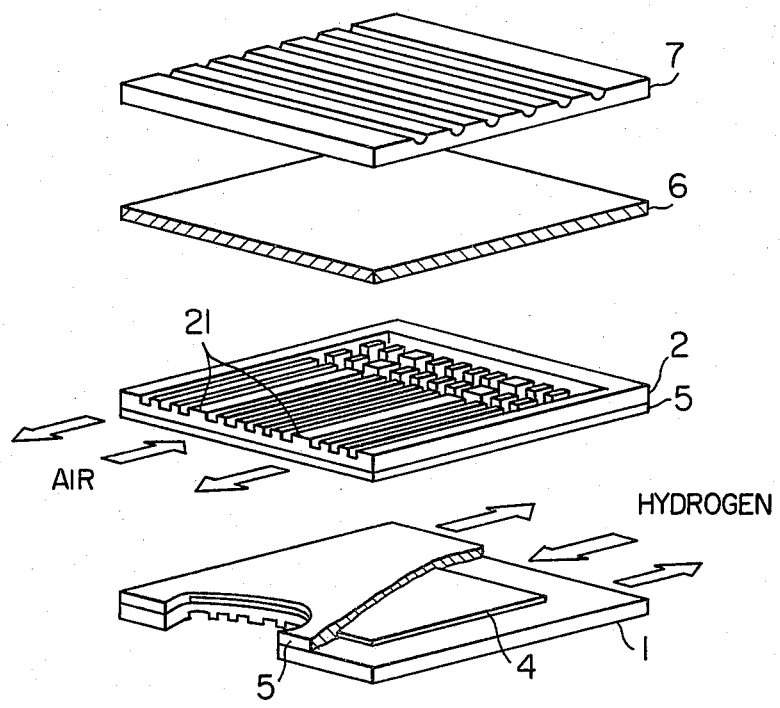
FIG. 4 is a schematic partial cutaway view of members constituting a fuel cell according to one embodiment of the present invention.
Figure 5:
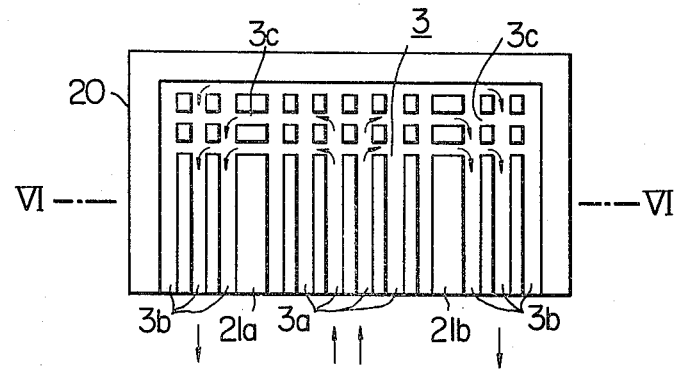
FIG. 5 is a plan view of the members of FIG. 4.
Figure 6:
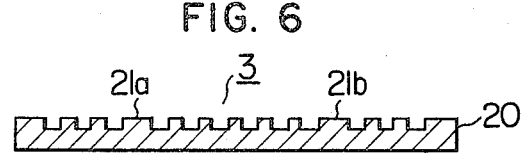
FIG. 6 is a cross-sectional view of FIG. 5 along the line VI—VI.
Figure 7:
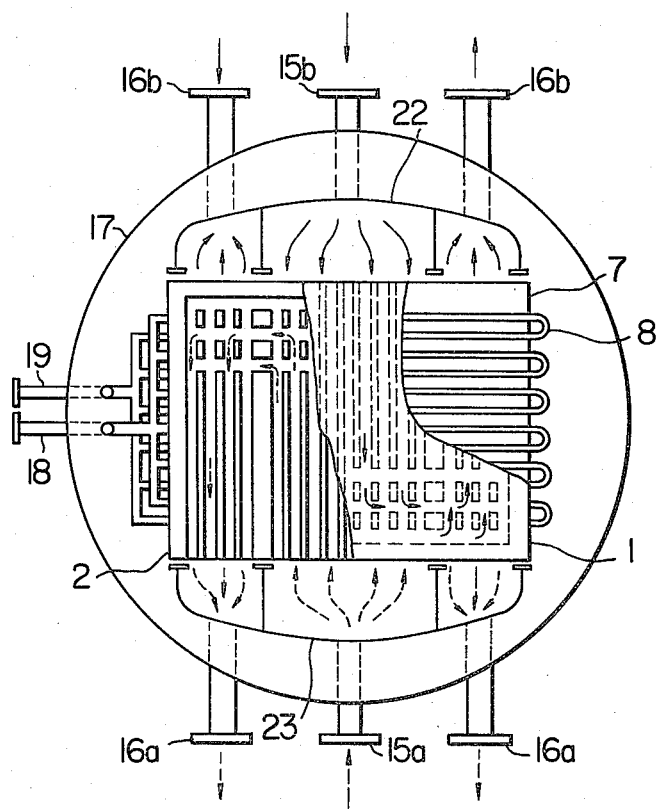
FIG. 7 is a partial cutaway plan view showing a stacked fuel cell in a housing tank according to the present invention.

In FIGS. 4–7, where the same reference numerals are used for the same members as in FIGS. 1–3, an electrode plate 20 is used as a fuel electrode 1 and an air electrode 2. A gas flow passage 3 provided on one side of the electrode plate 20 has a plurality of grooves formed between ribs in parallel to a pair of sides of the electrode plate 20, and the plurality of the grooves are divided into three flow paths by partition walls 21a and 21b formed with impregnated fluorine plastic, for example, teflon, fluorinated rubber, etc. according to the present embodiment. The center flow path is used as a gas inflow path and the flow paths at both sides of the center flow path as gas outflow paths. In that case, it is necessary to select the full width of the gas inflow path and that of the gas outflow paths in a ratio of the former to the latter of 1–3:1.

The grooves in the gas flow passage and the partition walls are made open at the remotest position from a gas inlet 3a and gas outlets 3b of the gas flow passage to effect communication between the grooves. In other words, the three side of the electrode plate 20 are closed as walls inhibiting inflow and outflow of the gas, and only the remaining one side is open to permit the inflow and outflow of the gas.

In the fuel electrode 1 and the air electrode 2 having such a structure as described above, a gas supplied to the grooves on the electrode plate 20 at the gas inlet 3a flows straight in the gas inflow path and then the straight flowing is inhibited by the wall at the opposite side. The gas takes U-turn at a bending section 3c which is the open section of the grooves and the partition walls, and flows through the grooves of the gas outflow paths of the gas flow passage and is discharged at the gas outlets 3b. During the gas flow in the gas flow passage, the gas takes uniform flow.

In the fuel cell, a catalyst layer is provided on the flat side of the electrode plate 20, that is, the opposite side to the ribbed side for the fuel gas or the air, and the electrode plates are stacked face-to-face through matrices so that each pair of the flat sides can face each other and the gas flow passage for the fuel gas and that for the air can be arranged in a counter-current flow pattern. A manifold 22 for the fuel gas and a manifold 23 for the air are provided at two opposite sides of stacked assembly at each side of which the gas inlet 3a and the gas outlets 3b are provided. The thus stacked assembly is encased in a housing tank 17. A cooling water supply pipe 18 and a cooling water discharge pipe 19 are provided at one of sides having no such manifolds. Pipings for the gas and the cooling water are provided through the housing tank 17 to communicate with the outside sources.

Hydrogen as a fuel gas and air are supplied into the fuel cell having the aforementioned structure. The hydrogen takes U-turn as indicated by full arrow lines in FIG. 7, and the air takes also U-turn as indicated by dotted arrow lines on the electrode plates, and electric current is generated at the catalyst layers through electrochemical reaction.

Figure 8:
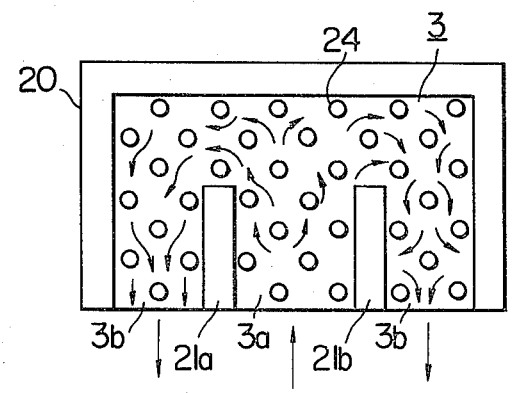
FIG. 8 is a plan view of the member according to another embodiment of the present invention.

When a large number of circular bosses 24, etc. are provided in the gas flow paths 3a and 3b partitioned by partition walls 21a and 21b in the gas flow passage 3 on the electrode plate 20 as shown in FIG. 8, the gas flow is further improved so that the gas flows uniformly as indicated by arrows, assuring uniform generation of electric current over the catalyst layers.

Figure 9:
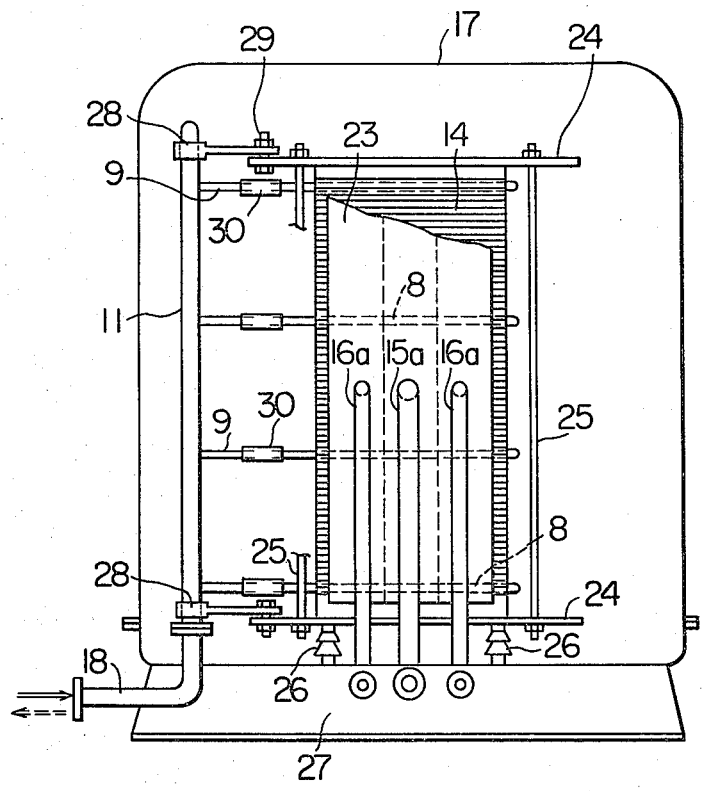
FIG. 9 is a side view showing detail of a stacked fuel cell in a housing tank according to the present invention.

In FIG. 9 showing the structure of a cooler in the housing tank 17 for the foregoing embodiment of the present invention, where the same reference numerals are used for the same members as in FIGS. 1–7, a stacked assembly 14 is fixed by tightening plates 24 and tightening rods 25 at the upper and lower ends thereof, and the thus tightened stacked assembly 14 is fixed to a manifold support 27 by supports 26. A cooling inlet pipe 18 and a cooling outlet pipe 19 are connected to an inlet branch 9 of inlet main pipe 11 and an outlet joint 10 of outlet main pipe 12, respectively, through coupling members 30 at one of the sides having no manifolds through joints 30, the inlet main pipe 11 and the outlet main pipe 12 being fixed to the fastening plate 24 through fixing members 28 by fixing bolts 29. In FIG. 9, the outlet joint 10, the outlet main pipe 12 and the cooling water discharge pipe 19 are overlapped by the inlet branch 9, the inlet main pipe 11 and the cooling water supply pipe 18, and are not shown in FIG. 9.

Cooling water is introduced through the cooling water supply pipe 18 fixed to the manifold support 27 to the inlet main pipe 11, then to the inlet branch 9 and cooling pipes 8. After the cooling, the cooling water is discharged in the reversed route to that for supplying the cooling water.

In the foregoing embodiment, the inlet main pipe 11 and the outlet main pipe 12 are connected to the cooling water supply pipe 18 and the cooling water discharge pipe 19, respectively, by means of flanges, and the inlet branch 9 and the outlet joint 10 are connected to the inlets and the outlets of the cooling pipes 8, through coupling members 30, and thus assembling and disassembling of the fuel cell can be carried out very easily.

In the normal operation, electric current is generated at a temperature of about 190° C., and in the shutdown, the temperature is lowered to the ambient temperature. Thus, expansion and shrinkage due to changes in cooling water take place at the inlet main pipe 11, outlet main pipe 12, inlet branch 9, outlet joint 10, etc. These expansion and shrinkage can be damped or absorbed by using a slidable structure in the fixing members 28 and a flexible pipe structure in the coupling members 30. Particularly, use of an insulating material in the coupling members 30 can effectively prevent short circuit between the inlet branch 9 or the outlet joint 10 and the cooling pipes 8.

Furthermore, cooling water piping can be provided at the side having no manifold, and thus assembling and disassembling as well as inspection of a fuel cell can be carried out very easily.

As described above, in the foregoing embodiment, fabrication of electrode plates can be made easily, and manifolds can be provided only at two sides of the stacked assembly. Further, cooling water piping is not provided within the manifolds, so that the structure of a fuel cell can be much simplified. Furthermore, leakage in the cooling water piping or gas leakage at the gas seal parts of the manifold can be easily inspected with a result of increased reliability in fabrication, operation and maintenance.

Figure 10:
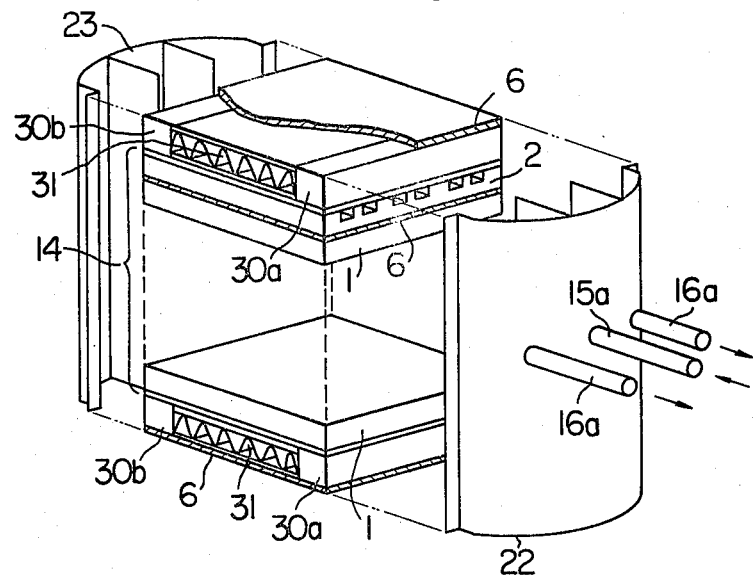
FIG. 10 is a schematic view showing a stacked state of a fuel cell according to another embodiment of the present invention.
Figure 11:
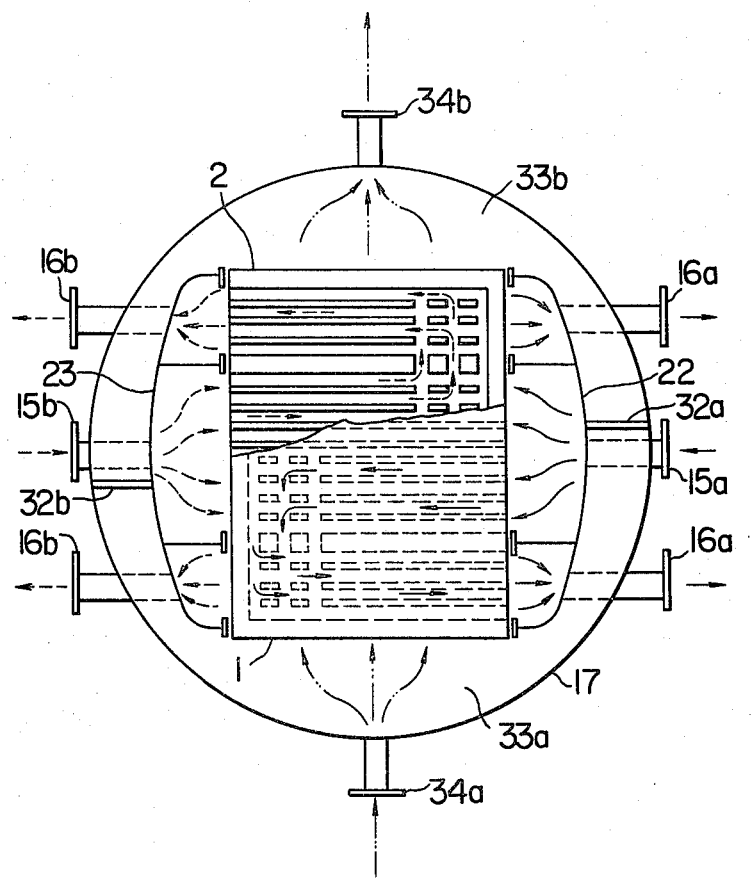
FIG. 11 is a partial cutaway plan view showing a stacked fuel cell in a housing tank according to the present invention.

In FIGS. 10 and 11, another embodiment of the present invention is shown, where the same reference numerals are used for the same members as in FIGS. 1–9. The present embodiment differs from those of FIG. 4–9 in that a cooling gas is used in place of the cooling water, and that the cooling pipes 8 and various pipings 9, 10, 11 and 12 for cooling water are not required. That is, in the present embodiment, compact coolers 31 are comprised of corrugated plates between sealing blocks 30a and 30b of graphite provided at both sides and of separators 6 provided at the upper and lower sides between the sealing blocks 30a and 30b. An inert gas such as a nitrogen gas, etc. is introduced into the compact coolers 31. That is, the inert gas is introduced into space 33a formed by partitioning a space between the housing tank 17 and the stacked assembly 14 with the manifolds 22 and 23 by partition plates 32a and 32b, so that the partitioned spaces 33a and 33b can each include one of the sides having no manifolds, through a gas supply pipe 34a at the housing tank 17, and then passes through the compact coolers 31 to cool the fuel cell. After passage through the compact coolers 31, the inert gas is withdrawn from the space 33b through a gas outlet pipe 34b at the housing tank 17.

In the fuel cell of the present embodiment, water cooling is replaced with gas cooling, and thus no cooling pipings are required. The coolers are prevented from any contact with the vapor of phosphoric acid, and thus applicable species of materials of construction is diversified, resulting in much cost reduction and unnecessity for electrical insulation of coolers. Thus, the structure of a fuel cell can be further simplified.

In the foregoing embodiments, gas flow passages are provided on the fuel electrode plates and the air electrode plates stacked face-to-face through matrices, but the gas flow passages can be provided on the separators, which are used for stacking a plurality of unit cells, with the equal function and equal effect.

As described above, the present invention provides a fuel cell of manifold type having a simple structure and a high reliability in fabrication, operation and maintenance, with a great commercial significance.

What is claimed is:

1. In a fuel cell comprising a plurality of unit cells each comprising a fuel electrode plate, an oxidizing agent electrode plate and a matrix, the fuel electrode plate and the oxidizing agent plate being disposed face-to-face through the matrix, the unit cells being stacked through separators between the unit cells, forming a stacked assembly, a gas flow passage for fuel electrode and oxidizing agent electrode being provided on one side each of the electrode plates or the separators, and manifolds for gas supply and discharge to the gas flow passages on the electrode plates or the separators being provided at sides of the stacked assembly, an improvement comprising the gas flow passage having at least one gas inlet and at least one gas outlet at one outer edge of the electrode plate or separator, the at least one gas inlet and the at least one gas outlet adjacent thereto being isolated by at least one partition wall extended therebetween along a gas flow direction and open at a position most remote from the gas inlet and gas outlet, thereby forming a U-type passage having at least one gas inflow path starting at said at least one inlet and at least one gas outflow path ending at said at least one outlet, said at least one gas inflow path and said at least one gas outflow path communicating with each other at the most remote position, the gas flow passage for the fuel electrode and the gas flow passage for the oxidizing agent electrode being arranged in a counter-current relation to each other, the at least one gas inlet and the at least one gas outlet for the fuel electrode and the at least one gas inlet and the at least one gas outlet for the oxidizing agent electrode being provided at the opposite sides of the stacked assembly, respectively, and communicated respectively with the manifolds provided at the same opposite sides of the stacked assembly.

2. The fuel cell according to claim 1, wherein the gas inflow path and the gas outflow path of the gas flow passage are provided with a plurality of grooves that extend from said outer edge in parallel with a gas flow direction, and the grooves are open to one another and communicated with one another at the most remote position from the gas inlet and the gas outlet.

3. The fuel cell according to claim 1, where a plurality of bosses are provided in the gas flow passage.

4. The fuel cell according to claim 1, 2 or 3, wherein a ratio of the full width of the gas inflow path of the gas flow passage to that of the gas outflow passage is 1–3:1.

5. The fuel cell according to claim 1, wherein the stacked assembly is encased in a housing tank.

6. The fuel cell according to claim 1, 2, or 3, wherein an inlet and an outlet for cooling medium for coolers in the stacked assembly are provided at the sides free from the manifolds of the stacked assembly.

7. The fuel cell according to claim 6, wherein the inlet and the outlet for cooling medium for the cooler are provided at one and same side free from the manifolds of the stacked assembly, and a supply pipe and a discharge pipe for cooling water are communicated to the inlet and the outlet, respectively, through the housing tank.

8. The fuel cell according to claim 6, wherein the inlet and the outlet for cooling medium to the coolers are provided at two opposite sides of the stacked assembly, and a supply pipe and a discharge pipe for cooling gas are provided at the housing tank and communicated with the inlet and the outlet, respectively, through spaces divided by partition walls in the housing tank.

* * * * *